(12) United States Patent
Fennel

(10) Patent No.: US 6,322,169 B1
(45) Date of Patent: Nov. 27, 2001

(54) METHOD FOR CONTROLLING BRAKE FORCE DISTRIBUTION

(75) Inventor: Helmut Fennel, Bad Soden (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/554,648

(22) PCT Filed: Nov. 15, 1998

(86) PCT No.: PCT/EP98/07074

§ 371 Date: Jul. 14, 2000

§ 102(e) Date: Jul. 14, 2000

(87) PCT Pub. No.: WO99/26819

PCT Pub. Date: Jun. 3, 1999

(30) Foreign Application Priority Data

Nov. 20, 1997 (DE) ............................... 197 51 430
Jul. 1, 1998 (DE) ............................... 198 29 419

(51) Int. Cl.⁷ ................... B60T 8/00; B60T 8/26
(52) U.S. Cl. .................. 303/186; 188/349; 303/113.5
(58) Field of Search .................. 303/186, 113.5, 303/187, 188, 199, 183, 176, 166, 155, 9.62, 9.75; 188/349, 181 C, 188 A; 701/70, 71, 78, 82, 83

(56) References Cited

U.S. PATENT DOCUMENTS

| 3,874,741 | 4/1975 | Schnaibel et al. |
| 5,632,535 | * 5/1997 | Luckevich et al. .......... 303/186 |
| 5,887,957 | * 3/1999 | Buttner et al. .......... 303/186 |

FOREIGN PATENT DOCUMENTS

| 43 09 243 | 9/1994 | (DE) . |
| 43 38 542 | 5/1995 | (DE) . |
| 195 26 422 | 2/1996 | (DE) . |
| 44 38 017 | 5/1996 | (DE) . |
| 195 10 746 | 9/1996 | (DE) . |
| 196 20 585 | 11/1997 | (DE) . |
| 2 105 290 | 4/1972 | (FR) . |
| 2 170 019 | 9/1973 | (FR) . |
| 2 307 017 | 5/1997 | (GB) . |
| 97 08031 | 3/1997 | (WO) . |

OTHER PUBLICATIONS

Search Report of the German Patent Office for Application No. 198 24 419.0.

* cited by examiner

Primary Examiner—Douglas C. Butler
(74) Attorney, Agent, or Firm—Rader, Fishman & Grauer PLLC

(57) ABSTRACT

To govern or control the distribution of brake force, first a switch-over to maintaining the brake force or the braking pressure on the rear wheels constant will be performed upon the commencement and/or detection of a braking operation. From the initial vehicle deceleration upon commencement of the braking operation, a vehicle reference quantity is derived by measuring the rotational behavior of the rear wheels, by filtering the measured values and by extrapolation, whereupon the current rotational behavior of the rear wheels is compared with this reference quantity. Preferably, three cases are distinguished in the analysis of the rotational behavior of the rear wheels and thereafter, depending on the result of the analysis, the braking pressure is kept constant or braking pressure increase in the rear-wheel brakes is allowed.

22 Claims, 3 Drawing Sheets

METHOD FOR CONTROLLING BRAKE FORCE DISTRIBUTION

TECHNICAL FIELD

The present invention generally relates to vehicle brake systems and more particularly relates to a system of electronically governing or controlling the distribution of brake force to the front and the rear wheels of an automotive vehicle (so-called EBD control) and/or for anti-lock control of the rear wheels (RA-ABS), wherein the brake force or the braking pressure in the rear wheels is governed or controlled in dependence on the wheel rotational behavior.

BACKGROUND OF THE INVENTION

A method for the electronic control of brake force distribution (EBD control) has been disclosed in the art wherein the brake slip which occurs on the front wheels is compared to the slip of the rear wheels (DE 33 01 948 A1, DE 33 23 402 C2). The rear-wheel brake slip is limited to a defined percentage, for example to 85 to 87%, of the front-axle brake slip by modulation and limitation of the braking pressure introduced into the wheel brakes of the rear wheels. Of course, a method of this type necessitates measuring the rotational behavior of both the front wheels and the rear wheels.

In addition, relatively small rotational speed differences and low slip values must be determined and evaluated for the control of brake force distribution because EBD control takes place already in the partial braking range, that is, at low slip values. Consequently, high demands are placed on the accuracy of determining and evaluating the rotational behavior and the slip values.

DE 44 17 935 A1 (P 7662) discloses a circuit arrangement for an EBD control which comprises circuits by which the deceleration of the rear wheels and the deceleration of the vehicle is determined. The difference between the rear-wheel deceleration and the vehicle deceleration is evaluated for controlling the brake force distribution. This means that deceleration values rather than the slip values are made the basis of the control in this prior art circuit in order to reduce the demands placed on the measuring accuracy of the sensors. However, the system or the circuit, respectively, now as before is based on the determination of the rotational behavior of all vehicle wheels, even though the objective remains that the vehicle deceleration be determined by approximation in the event of failure of a front-wheel sensor.

An object of the present invention is to develop a method of controlling the brake force distribution which manages with one or two rotational speed sensors without having to tolerate a reduced effectivity of the control, i.e., with respect to maintaining driving stability or a shortest possible stopping distance. This is because an excessively high pressure on the rear wheels would jeopardize driving stability and a too low braking pressure would render the stopping distance longer.

This object can be achieved by the present invention wherein after the commencement and/or detection of a braking operation or brake actuation process, a switch-over to maintaining the brake force or the braking pressure on the rear wheels constant is performed, that from the initial vehicle deceleration upon commencement of the braking operation, a vehicle reference quantity or vehicle reference speed is derived by measuring the rotational behavior of the rear wheels, by filtering the measured values and by extrapolation, that the current rotational behavior of the rear wheels is compared with this reference quantity, and that the rotational behavior in comparison with the reference quantity is evaluated for controlling the brake force distribution (EBD control) and/or for anti-lock control of the rear wheels.

Thus, the present invention is based on the knowledge that the need for wheel sensors on the front wheels is eliminated in an EBD control when the rotational speed information acquired on the differential or on the two rear wheels, after extrapolation of the information acquired in the period of measurement, is evaluated to produce a reference quantity, and when the current information determined subsequent to the period of measurement is assessed in the way described and evaluated for the EBD control. Depending on the respective situation, as will be described hereinbelow in detail, the braking pressure on the rear-wheel brakes is then continued to be maintained constant, or further pressure increase on the rear-wheel brakes is allowed. This is the basic principle.

Thus, the commencement of a braking operation or brake actuation process can be identified in a very simple fashion by evaluation of a brake light switch signal or any other signal which is triggered when the brake is actuated. Frequently, it is assumed appropriate to first wait for a short delay period or waiting period between the brake actuation and the determination and detection of the initial vehicle deceleration. This delay period may be in the order of 5 to 30 msec.

The reference quantity or vehicle reference speed is suitably determined after a predetermined measurement period which favorably ranges between 50 msec and 500 msec and starts with the detection of the braking operation or brake actuation process, or upon expiry of the additional delay or waiting period.

According to one embodiment of the present invention, the braking pressure in the rear-wheel brakes is maintained constant, at least in appoximation, until the braking operation is terminated when, upon detection of the brake actuation process and determination of the reference quantity, the wheel deceleration or the difference between the current speed of the respective rear wheel and the reference quantity remain constant or increase to an only relatively small extent. Further braking pressure increase on the rear wheels is allowed when the current wheel deceleration decreases or the current wheel speed approaches the reference quantity.

In another especially favorable embodiment of the method of the present invention, the pressure variation in the rear-wheel brakes is determined in approximation by sensing and evaluating pressure control or pressure adjusting signals and/or the rotational behavior of the rear wheels and by producing a pressure model. To produce the pressure model, especially the actuation times of the inlet and outlet valves are added and evaluated in consideration of the pressure increase and pressure decrease characteristic curves of the system. This permits a quick and relatively precise adjustment of the correct braking pressure in the rear-wheel brakes without additional expenditure in pressure sensors, additional monitoring circuits, etc.

DETAILED DESCRIPTION OF THE PREFERRED EMBODIMENTS

Figure 1:
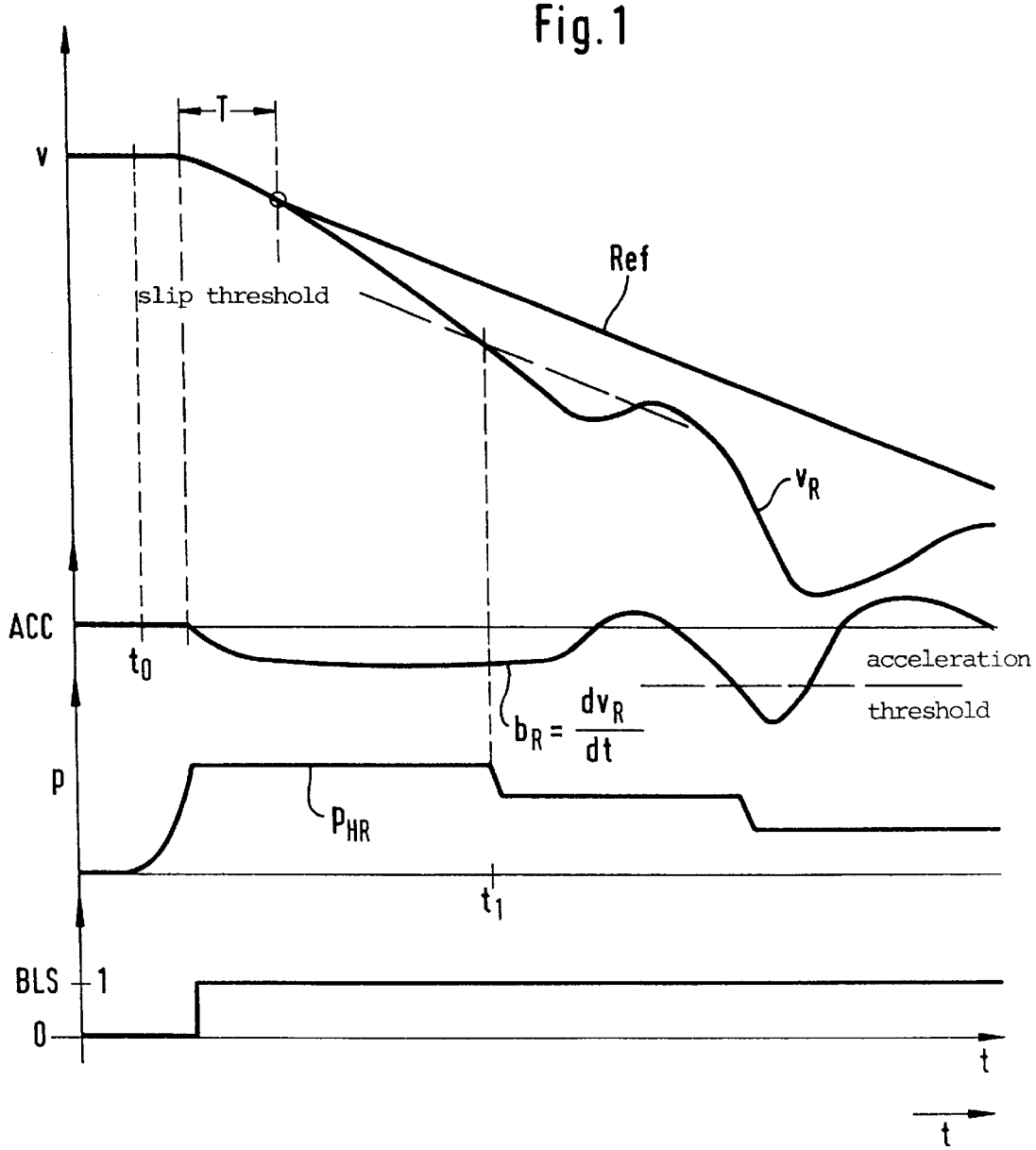
FIG. 1 shows several measured quantities and control quantities, i.e., the reference quantity, the speed of a rear wheel and said's acceleration, the braking pressure in the wheel brake of this wheel and a brake actuation signal, all quantities in the same time sequence to illustrate a defined situation.
Figure 2:
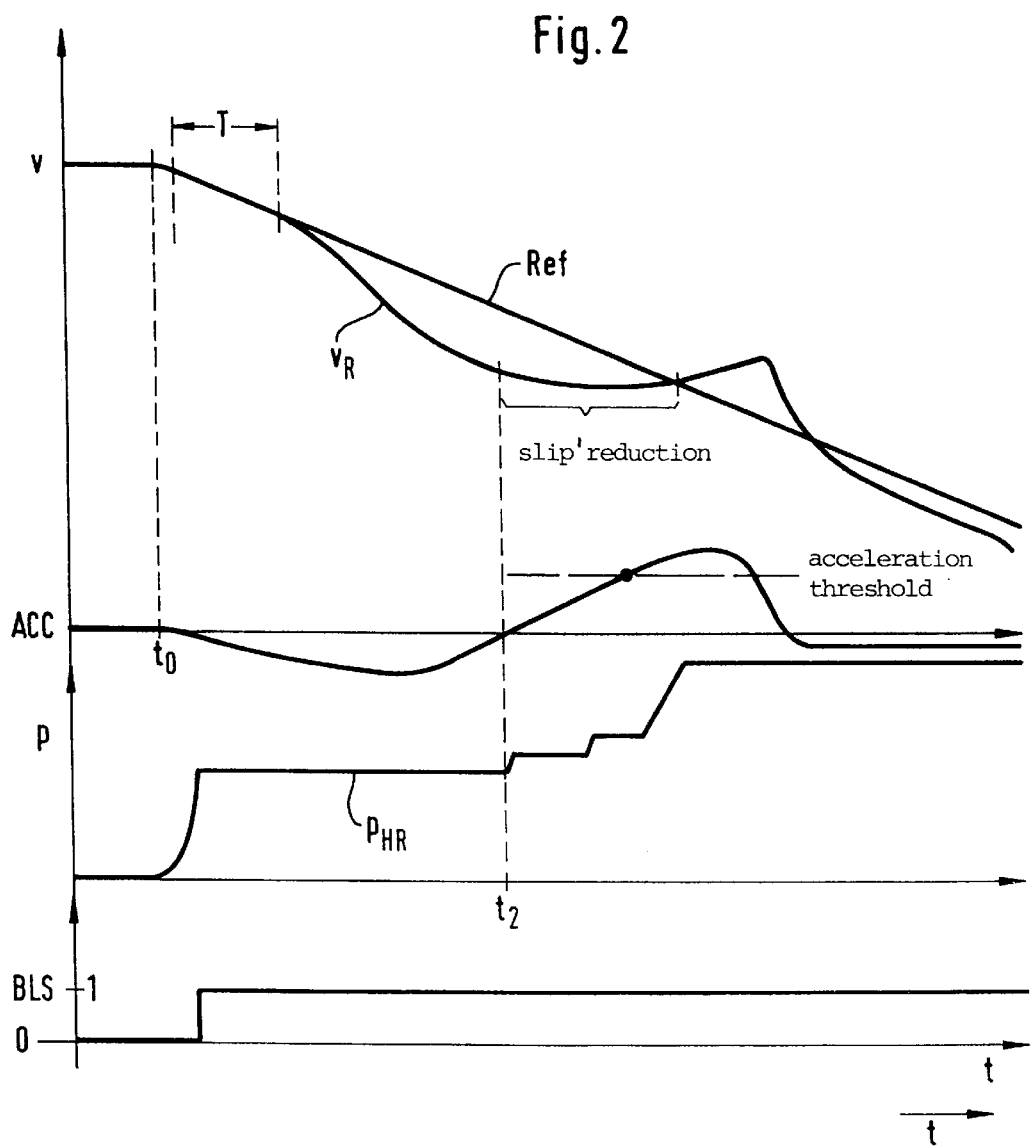
FIG. 2 shows the time variation in a second situation in the same way of illustration.
Figure 3:
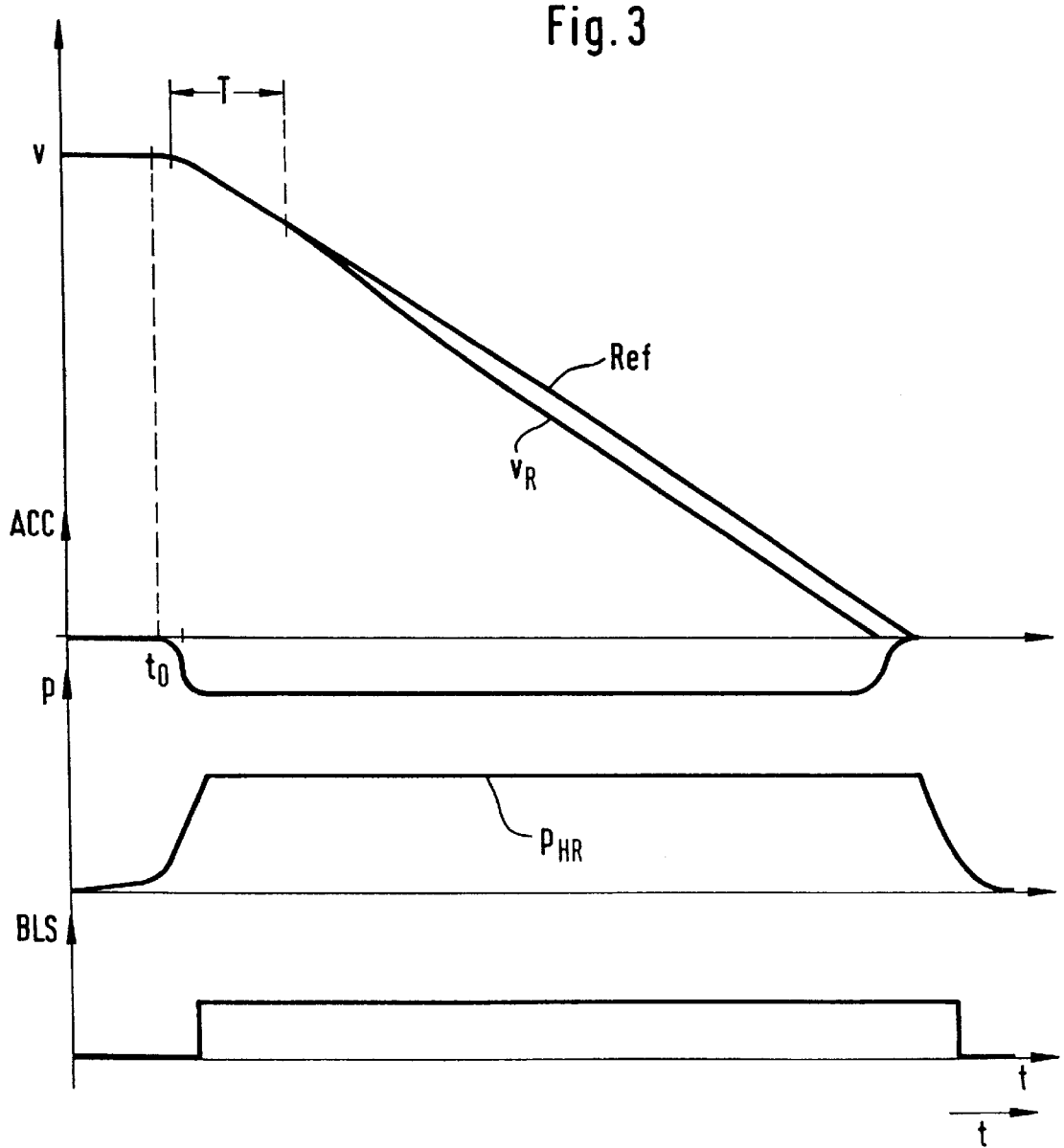
FIG. 3 shows the same quantities in a third situation.

The diagrams and curves in FIGS. 1 to 3 are used to explain the mode of function and effect of the method of the present invention and the corresponding device in different situations. The present invention founds on the state of the art rear-axle wheel lock prevention system, also called rear-axle ABS. In addition, an electronic control of the brake force distribution, i.e., an EBD function, shall be permitted by way of the valves, circuits, hydraulic components, sensors, etc., which are already provided in such systems by an extension of the control software.

A distinction must be made between front-wheel driven vehicles with a diagonal brake circuit allotment and rear-wheel driven and all-wheel driven vehicles with a black and white brake circuit allotment. According to the present invention, only two rotational speed sensors which individually measure the rotational behavior of the rear wheels are required in vehicles with front-wheel drive to achieve the EBD function, apart from the pressure modulators (hydraulic valves) which are necessary to control the braking pressure in the rear-wheel brakes. In vehicles with a rear-wheel drive or all-wheel drive, one single rotational speed sensor is sufficient which is arranged on the drive shaft of the differential.

In addition, the output signal of a brake light switch or any other switch which issues a signal upon brake actuation is evaluated.

To achieve the method of the present invention, the speed signals acquired by the rotational speed sensors are filtered, extrapolated with respect to the braking operation, and correlated with a quantity obtained by producing a braking pressure model.

The brake force on the rear wheels or the braking pressure in the rear-wheel brakes is controlled as follows.

A braking operation or brake actuation process commences at time $t_0$. This may be detected most simply by means of the brake light switch signal BLS (see FIGS. 1 to 3). In consequence of this brake actuation which the brake light switch BLS signals, or after a short delay or waiting period in the order between 5 msec and 30 msec, switch-over to maintaining the braking pressure constant is performed by actuation of the hydraulic valves which lead to the rear-wheel brakes. The wheel speed is measured at this time by measurement of the wheel speed $v_R$ of the corresponding rear wheel or both rear wheels by means of individual wheel sensors or a differential sensor. The deceleration of the vehicle is inferred from these measured values. When the rating of the brakes is known, that is, the relationship between deceleration and braking pressure, the braking pressure may now be calculated. This information may then be evaluated for the braking pressure increase and the production of a braking pressure model.

The initial vehicle deceleration is taken into account and evaluated after a measurement time T which ranges between 50 msec and 500 msec in the present embodiment by filtering and extrapolation for producing a vehicle reference quantity (Ref.). This reference quantity represents in approximation the vehicle speed and deceleration during the braking operation. The current speed $v_R$ of a rear wheel is now compared with the vehicle reference (Ref.) for an analysis of the situation.

A distinction can be made between three basic cases in the analysis of the wheel rotational behavior during a braking operation:

1. The measured current deceleration of the rear wheel $dv_R/dt$ increases during a braking operation, or the difference between the wheel speed $v_R$ and the vehicle reference Ref rises.
2. The measured current deceleration $dv_R/dt$ decreases during the braking operation analysed, or the wheel speed $v_R$ approaches the vehicle reference.
3. The current wheel deceleration remains constant in approximation, or the difference between the vehicle difference and the measured current wheel speed $v_R$ remains (almost) constant.

The embodiment of FIG. 1 relates to a situation where case 1 applies (at least until time $t_1$). Such a course of a wheel in comparison with reference Ref will occur, for example, when the driver increases the pedal force during the braking pressure, or when the road surface coefficient of friction is reduced. In this situation, the braking pressure in the rear-wheel brakes is maintained constant according to the present invention.

If, however, as is shown in FIG. 1, the wheel slip exceeds (at time $t_1$) a threshold (control threshold), and thereby signals a tendency to wheel lock, the braking pressure in the wheel concerned will be reduced according to known ABS algorithms in order to prevent such wheel lock. Anti-lock control will be superimposed on the EBD control according to FIG. 1 following time $t_1$.

Case 2 or situation 2, for which FIG. 2 shows an example, will e.g. occur when the driver reduces the pedal force and, thus, the braking pressure during the braking operation, or when the coefficient of friction rises. It is appropriate in a like situation to allow further braking pressure increase in the wheel brakes of the rear wheels in order to achieve a shortest possible stopping distance. Consequently, the braking pressure will be increased at time $t_2$ (FIG. 2) by opening the inlet valve that leads to the rear-wheel brakes, it being possible to dose the rise in pressure, for example, by a pulse train.

There is still case 3 to which the embodiment of FIG. 3 relates and which prevails when the initial deceleration that was evaluated for extrapolation and for producing the vehicle reference Ref corresponds in approximation with the current wheel rotational behavior. The deceleration of the vehicle and the braking pressure are thus adjusted 'properly'.

The braking pressure is maintained constant until the braking operation is terminated in this case.

It is possible to perform an EBD control operation alone on the basis of one or two wheel sensors by way of the analysis of the wheel rotational behavior, conducted according to the present invention, in comparison with the vehicle reference which is produced by filtering and extrapolation subsequent to the initial vehicle deceleration, and by way of the reaction of the control system according to the described criteria.

What is claimed is:
1. Method of governing or controlling a distribution of brake force to front and rear wheels of an automotive vehicle, wherein a brake force or the braking pressure in the rear wheels is governed or controlled depending on a wheel rotational behavior, the method comprising the steps of:
   a) detecting a commencement of a braking operation or a brake actuation process,
   b) introducing a delay period,
   c) maintaining the brake force or the braking pressure on the rear wheels constant at a first level,
   d) deriving a reference quantity by measuring, filtering and extrapolating values derived from a rotational behavior of the rear wheels, d) comparing a current rotational behavior of a rear wheel with the reference quantity, and e) evaluating the comparison of the current rotational behavior of the rear wheel with the reference quantity to control one of the brake force distribution and anti-lock control of the rear wheels.

2. Method as claimed in claim 1, wherein the commencement of the braking operation or the brake actuation process is detected by evaluating a brake light switch signal.

3. Method as claimed in claim 1, wherein the delay period is in the range of 5 msec to 30 msec.

4. Method as claimed in claim 1, wherein the reference quantity is determined during a measurement period.

5. Method as claimed in claim 4, wherein the measurement period is in the range of 50 msec to 500 msec.

6. Method as claimed in claim 1, wherein the rotational behavior of the rear wheels is determined by means of a differential sensor.

7. Method as claimed in claim 6, wherein the rotational behavior of the rear wheels is measured by means of a rotational speed sensor on each individual rear wheel.

8. Method as claimed in claim 1, wherein the braking pressure in the rear wheels is maintained generally constant until the braking operation is terminated when, after detection of the brake actuation process and determination of the reference quantity, the wheel deceleration or the difference between the current speed of the rear wheel and the reference quantity remain constant or increase to a relatively small extent.

9. Method as claimed in claim 1, further including the step of maintaining the brake force on the rear wheels at a second level, wherein said second level represents a greater brake pressure than said first level, and wherein said second level is allowed when the current wheel deceleration decreases or when the current wheel speed approaches the reference quantity.

10. Method as claimed in claim 9, wherein said current wheel speed is calculated as the average value between the speeds of both rear wheels.

11. Method as claimed in claim 1, wherein a variation in braking pressure in the rear wheels is approximated by acquiring and evaluating one of pressure control signals, pressure adjusting signals, and the rotational behavior of the rear wheels and by producing a pressure model.

12. Method of governing or controlling a distribution of brake force to a vehicle having front wheels, rear wheels, brakes associated with the front wheels and the rear wheels, and a brake system with adjustment of the brake force distribution to the brakes associated with the rear wheels, a brake force or a braking pressure in the rear wheels being controlled depending on a wheel rotational behavior, the method comprising the steps of:

a) detecting a commencement of a braking operation or a brake actuation process, b) introducing a delay period or a waiting period, c) maintaining the brake force or the braking pressure on the rear wheels constant at a first level after expiry of the delay period or the waiting period, d) measuring a wheel speed of one or more rear wheels during a measurement period, e) deriving a reference quantity for the braking operation or the brake actuation process, g) comparing one of a current wheel speed and a current vehicle deceleration to the reference quantity, and g) controlling the brake force distribution of the rear wheels based on the comparison step.

13. Method as claimed in claim 12, wherein the reference quantity is derived from an initial vehicle deceleration during the measurement period.

14. Method as claimed in claim 13, wherein the initial vehicle deceleration is derived by measuring a wheel speed of only one rear wheel.

15. Method as claimed in claim 12, wherein the wheel speed is measured by means of a differential wheel sensor.

16. Method as claimed in claim 12, wherein the wheel speed is measured by means of an individual wheel sensor.

17. Method as claimed in claim 12, wherein the commencement of the braking operation or the brake actuation process is detected by evaluating a brake light switch signal.

18. Method as claimed in claim 12, wherein the delay period is in the range of 5 msec to 30 msec.

19. Method as claimed in claim 12, wherein the measurement period is in the range of 50 msec to 500 msec.

20. Method as claimed in claim 12, wherein the braking pressure in the rear wheels is maintained generally constant until the braking operation is terminated when, after detection of the brake actuation process and determination of the reference quantity, the wheel deceleration or the difference between the current wheel speed of the one or more rear wheels and the reference quantity remain constant or increase to a relatively small extent.

21. Method as claimed in claim 12, further including the step of maintaining the brake force on the rear wheels at a second level, wherein said second level represents a greater brake pressure than said first level, and wherein said second level is allowed when the current wheel deceleration decreases or when the current wheel speed approaches the reference quantity.

22. Method as claimed in claim 12, wherein the current wheel speed is calculated as the average value between the speeds of both rear wheels.

* * * * *